(12) United States Patent
Ho et al.

(10) Patent No.: US 11,119,590 B2
(45) Date of Patent: Sep. 14, 2021

(54) OPTO-ELECTRONIC MODULE

(71) Applicant: Chicony Power Technology Co., Ltd., New Taipei (TW)

(72) Inventors: Hsuan-Wei Ho, New Taipei (TW); Yueh-Heng Lee, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 7 days.

(21) Appl. No.: 16/948,047

(22) Filed: Aug. 28, 2020

(65) Prior Publication Data

US 2021/0064156 A1 Mar. 4, 2021

Related U.S. Application Data

(60) Provisional application No. 62/893,215, filed on Aug. 29, 2019.

(30) Foreign Application Priority Data

Aug. 7, 2020 (TW) .................................. 109126980

(51) Int. Cl.
*G06F 3/041* (2006.01)
*F21V 8/00* (2006.01)
*F21V 29/83* (2015.01)

(52) U.S. Cl.
CPC .............. *G06F 3/041* (2013.01); *F21V 29/83* (2015.01); *G02B 6/0036* (2013.01);
(Continued)

(58) Field of Classification Search
CPC ........ F21V 29/83; F21V 31/03; G02B 6/0085; H05K 1/0204; H05K 1/0206
See application file for complete search history.

(56) References Cited

U.S. PATENT DOCUMENTS 8,072,420 B2 * 12/2011 Murakami ............ G06F 3/0443
345/156
2010/0259485 A1 10/2010 Chuang
(Continued)

FOREIGN PATENT DOCUMENTS

CN 101509623 A 8/2009
CN 101751175 B 10/2012
(Continued)

*Primary Examiner* — Keith G. Delahoussaye
(74) *Attorney, Agent, or Firm* — Innovation Capital Law Group, LLP; Vic Lin

(57) ABSTRACT

An opto-electronic module includes a circuit board, a light-emitting assembly, a contact sheet, a light shielding structure, and an outer block. The circuit board has a surface and a groove on the surface. The light-emitting assembly includes a light guide plate and a light-emitting element set. The contact sheet is above the light guide plate. The light shielding structure is above the light guide plate or below the contact sheet. The light shielding structure has an opening. The opening corresponds to a microstructure. The outer block is at an outer periphery of the light guide plate, there is a gap between the outer block and the light guide plate, and the outer block is between the contact sheet and the circuit board. One end of the groove is in communication with the gap, and the other end of the groove is in communication with the environment outside the opto-electronic module.

16 Claims, 6 Drawing Sheets

(52) U.S. Cl.
CPC ......... *G02B 6/0055* (2013.01); *G02B 6/0083* (2013.01); *G02B 6/0085* (2013.01)

(56) References Cited

U.S. PATENT DOCUMENTS

| | | |
|---|---|---|
| 2010/0271839 A1 | 10/2010 | Chan et al. |
| 2016/0170565 A1* | 6/2016 | Ilmonen ............... G06F 3/0428 345/175 |
| 2019/0285934 A1 | 9/2019 | Fujii |

FOREIGN PATENT DOCUMENTS

| | | |
|---|---|---|
| CN | 101751176 B | 6/2013 |
| CN | 103873627 A | 6/2014 |
| CN | 105892152 A | 8/2016 |
| CN | 207421963 U | 5/2018 |
| CN | 109388293 A | 2/2019 |
| CN | 110177158 A | 8/2019 |
| CN | 209590476 U | 11/2019 |
| CN | 110658933 A | 1/2020 |
| TW | I409677 B | 9/2013 |
| TW | M545922 U | 7/2017 |
| TW | M571515 U | 12/2018 |
| TW | 201911111 A | 3/2019 |
| TW | I669647 B | 8/2019 |

\* cited by examiner

OPTO-ELECTRONIC MODULE

CROSS-REFERENCES TO RELATED APPLICATIONS

This application claims the priority benefit of U.S. provisional application Ser. No. 62/893,215, filed on Aug. 29, 2019 and Patent Application No. 109126980 filed in Taiwan, R.O.C. on Aug. 7, 2020. The entirety of the above-mentioned patent applications are hereby incorporated by references herein and made a part of the specification.

BACKGROUND

Technical Field

The present invention relates to an opto-electronic module, and in particular, to a low-profile illuminated touch module.

Related Art

A general electronic product such as a notebook computer usually has a physical button and a touch panel. With the development of a low-profile portable electronic product, available space on the body is relatively reduced. Therefore, a thin and light notebook computer may not have numeric keys, and instead, a virtual numeric keyboard is displayed on the touch panel. That is, an opto-electronic module that combines the functions of the "touch panel" and a "backlight module", for example, an illuminated touch module, may display the numeric keyboard and visual patterns on the touch panel through the backlight module.

SUMMARY

However, the inventor realizes that in the process of combining a touch panel and a backlight module, an illuminated touch module has a gap causing a bubble/air to be kept inside, and the illuminated touch module uses a light blocking structure to prevent light leakage, but the light blocking structure also prevents internal air bubbles/air from communicating with external ambient air, causing the problem of poor reliability due to expansion of the internal air. In view of this, some embodiments of the present invention provide an opto-electronic module, and in particular, to an illuminated touch module suitable for slimming.

According to some embodiments of the present invention, an opto-electronic module includes a circuit board, a light-emitting assembly, a contact sheet, a light shielding structure, and an outer block. The circuit board has a surface and a groove on the surface. The light-emitting assembly includes a light guide plate and a light-emitting element set. The light guide plate is on the surface of the circuit board. The light guide plate has a light-emitting top surface and a light guide bottom surface opposite to the light-emitting top surface, a light incident side surface connects to the light-emitting top surface and the light guide bottom surface, and a microstructure is on the light guide bottom surface. The light-emitting element set is at the light incident side surface of the light guide plate and is electrically connected to the circuit board. The light-emitting element set is configured to emit a ray of light toward the light guide plate when being driven. The contact sheet is above the light-emitting top surface. The contact sheet has a semi-transparent film. The semi-transparent film faces the light-emitting top surface. The light shielding structure is above the light-emitting top surface or below the contact sheet. The light shielding structure has an opening. The opening corresponds to the microstructure. The outer block is at an outer periphery of the light guide plate, there is a gap between the outer block and the light guide plate, and the outer block is between the contact sheet and the circuit board. One end of the groove is in communication with the gap, and the other end of the groove is in communication with the environment outside the opto-electronic module.

According to some embodiments of the present invention, the outer block has an inner side surface, an outer side surface, and a channel. The inner side surface faces the light guide plate, the outer side surface is opposite to the inner side surface, and the channel is in communication with the inner side surface and the outer side surface, where the light-emitting element set is in the gap between the outer block and the light guide plate, and the channel is in communication with the gap.

According to some embodiments of the present invention, an adhesive layer is further included. The adhesive layer is on at least one of the light-emitting top surface and the light guide bottom surface of the light guide plate and has an adhesive region and a give-way region adjacent to the adhesive region, where an orthographic projection of the adhesive region with respect to the light guide plate does not overlap the microstructure, and the give-way region is in communication with the gap.

According to some embodiments of the present invention, an opto-electronic module includes a circuit board, a light-emitting assembly, a contact sheet, a light shielding structure, and an outer block. The light-emitting assembly includes a light guide plate and a light-emitting element set. The light guide plate is above the circuit board. The light guide plate has a light-emitting top surface and a light guide bottom surface opposite to the light-emitting top surface, a light incident side surface connects to the light-emitting top surface and the light guide bottom surface, and a microstructure is on the light guide bottom surface. The light-emitting element set is at the light incident side surface of the light guide plate and is electrically connected to the circuit board. The light-emitting element set is configured to emit a ray of light toward the light guide plate when being driven. The contact sheet is above the light-emitting top surface. The contact sheet has a semi-transparent film. The semi-transparent film faces the light-emitting top surface. The light shielding structure is above the light-emitting top surface or below the contact sheet. The light shielding structure has an opening. The opening corresponds to the microstructure. The outer block is at an outer periphery of the light guide plate, and there is a gap between the outer block and the light guide plate. The outer block is between the contact sheet and the circuit board. The outer block has an inner side surface, an outer side surface, and a channel. The inner side surface faces the light guide plate, the outer side surface is opposite to the inner side surface, and the channel is communication with the inner side surface and the outer side surface. The light-emitting element set is in the gap between the outer block and the light guide plate, and the channel is in communication with the gap.

Therefore, according to some embodiments, the opto-electronic module has an air escape structure with two ends respectively in communication with internal and external environments. The air escape structure makes the internal air pressure and the external air pressure of the opto-electronic module to achieve balance, so as to prevent an internal component of the opto-electronic module from being damaged and failure due to air expansion, so that the product reliability of the opto-electronic module can be improved through the air escape structure. In addition, if the opto-electronic module performs touch sensing under a balanced or similar atmospheric pressure, a more accurate sensing result can be obtained, which facilitates improvement of the accuracy and sensitivity of the opto-electronic module.

The following details are illustrated by using specific embodiments with reference to the accompanying drawings, so that it is easier to understand the purpose, the technical content, the features, and the effects achieved therein.

DETAILED DESCRIPTION

Figure 1:
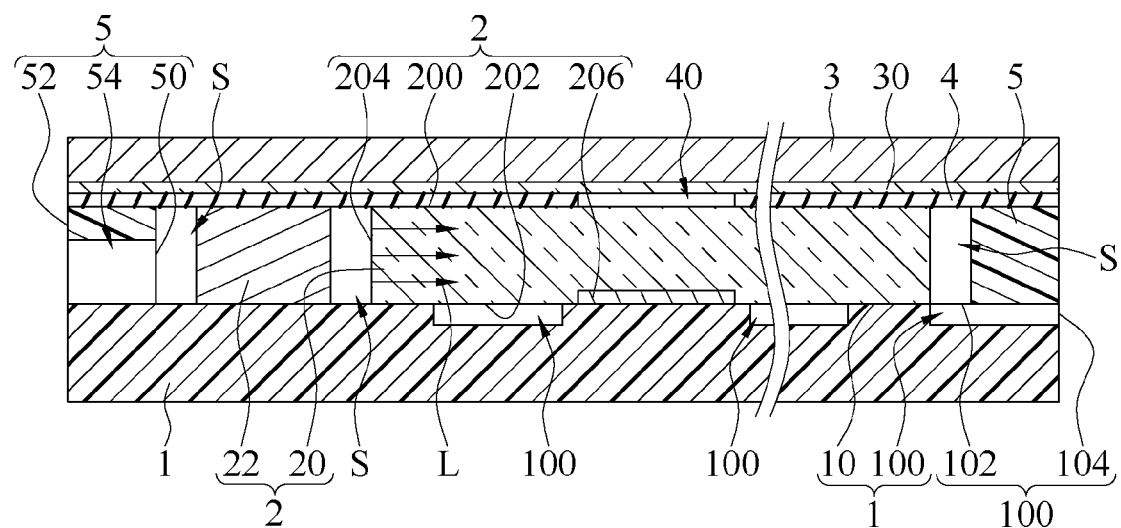
FIG. 1 is a schematic side view of an opto-electronic module according to some embodiments of the present invention.

The embodiments of the present invention will be described in detail below by way of example and with reference to the accompanying drawings. In the specification, numerous specific details are set forth in order to provide a thorough understanding of the invention. However, the invention may be practiced without some or all of the specific details. The same or similar elements in the drawings will be denoted by the same or similar symbols. It should be noted that the accompanying drawings are only schematic, and do not represent the actual size or quantity of elements. Some details may not be completely drawn, so as to keep the accompanying drawings concise.

Figure 3:
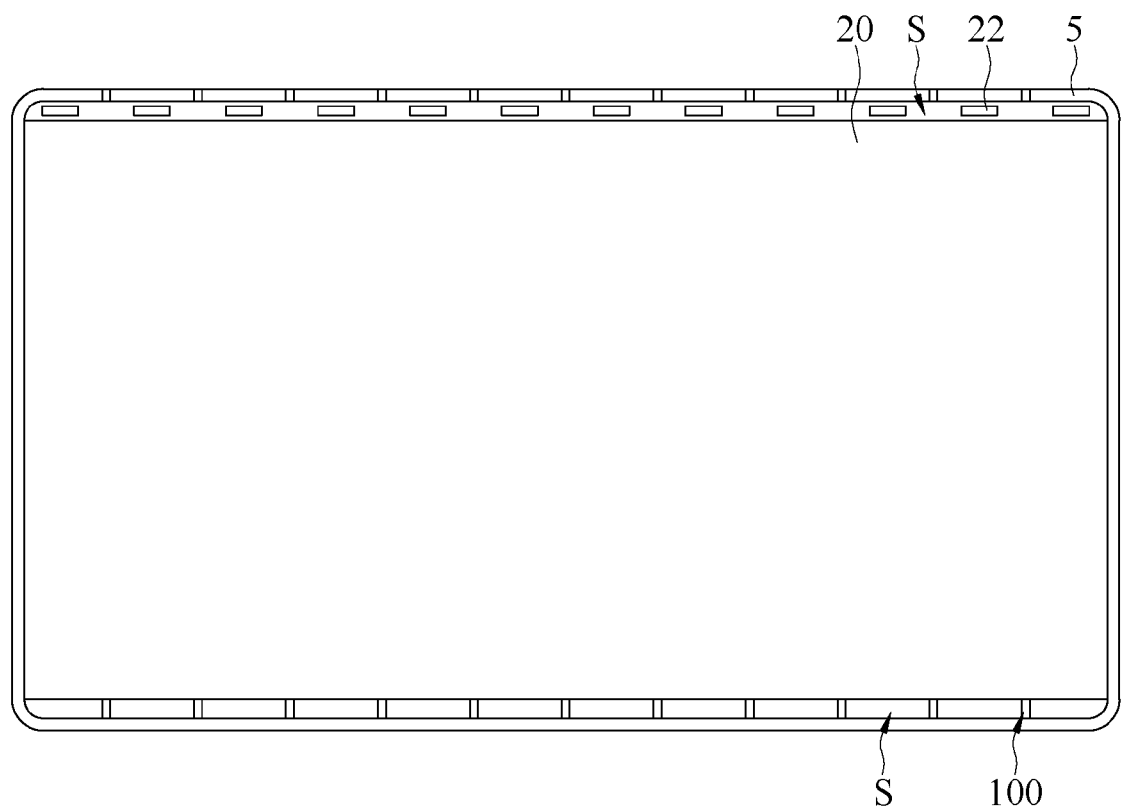
FIG. 3 is a schematic top view of a light guide plate according to the embodiment shown in FIG. 1.

Referring to FIG. 1 and FIG. 3 together, according to an embodiment of the present invention an opto-electronic module includes a circuit board 1, a light-emitting assembly 2, a contact sheet 3, a light shielding structure 4, and an outer block 5.

The opto-electronic module is a multifunctional touch panel that combines a touch panel and a backlight module, which usually has at least two operating modes. In a normal mode, when the opto-electronic module does not emit light, and appears opaque, which is not different from a normal touch panel and may be used to control a mouse cursor, click to select and control, and the like. In an illuminated mode, the opto-electronic module is capable of emitting a specific pattern and character, for example, displaying a virtual numeric keyboard and checkerboard grid lines. Take an application of the foregoing notebook computer for example, a controller of the notebook computer will perform a process according to a touch signal returned by the opto-electronic module, as a corresponding number that is touched. The opto-electronic module is, for example, but not limited to, the touchpad used in the notebook computer. In this application, the opto-electronic module converts a touch event of a user into a touch signal and sends the signal to the controller of the notebook computer, and the controller performs the corresponding processing.

The circuit board 1 has a surface 10, the surface 10 including at least one groove 100. One end 102 of the groove 100 is in communication with a gap S, and the other end 104 of the groove 100 is in communication with the environment outside the opto-electronic module. Accordingly, there is a groove 100 between the surface 10 and an outer block 5, the groove 100 serving as an air escape structure through which the gap S is in communication with an external environment.

In some embodiments, the circuit board 1 is a flexible printed circuit board. For example, the circuit board is a glass fiber (FR4/FR5/FRP) printed circuit board.

A light-emitting assembly 2 includes a light guide plate 20 and a light-emitting element set 22. The light guide plate 20 is located on the surface 10. The light guide plate 20 has a light-emitting top surface 200, a light guide bottom surface 202, a light incident side surface 204, and a microstructure 206. The light-emitting top surface 200 and the light guide bottom surface 202 are disposed opposite to each other. Two ends of the light incident side surface 204 are respectively connected to the light-emitting top surface 200 and the light guide bottom surface 202, and the microstructure 206 is located on the light guide bottom surface 202 and corresponds to the light-emitting top surface 200.

The light-emitting element set 22 includes a plurality of light-emitting diode elements, and the plurality of light-emitting diode elements are electrically connected to the circuit board 1. The light-emitting element set 22 emits a ray of light L when being driven, causing the ray of light L to enter the light guide plate 20. For example, the circuit board 1 includes a light-emitting drive circuit electrically connected to the light-emitting element set 22, and the light-emitting drive circuit provides a driving current to turn on the light-emitting element set 22. As a result, the light-emitting element set 22 is located at the light incident side surface 204 of the light guide plate 20, and emits the ray of light L toward the light guide plate 20, so that the ray of light L enters the light guide plate 20 from the light incident side surface 204, and produces total reflection when encountering a boundary of the light guide plate 20, to improve light utilization. In addition, the light guide plate 20 guides the ray of light L to the microstructure 206 for scattering to generate a predetermined pattern. The predetermined pattern may be, for example, but not limited to, a numeric keyboard image including checkerboard grid lines or a character interface, a visual image for adjusting the volume, and the like, which can be used by the user to observe and operate the opto-electronic module from outside of the contact sheet 3.

The contact sheet 3 is located above the light-emitting top surface 200 and is used for the user to touch, and the ray of light L passes through the contact sheet 3 for the user to see. A lower surface of the contact sheet 3 has a semi-transparent film 30, the semi-transparent film 30 faces the light-emitting top surface 200. In some embodiments, the surface of the contact sheet 3 is smoothened or/and hardened to facilitate touching by the user and/or improvement of wear resistance. In some embodiments, a material of the contact sheet 3 may be, but not limited to, a transparent or semi-transparent material, for example, but not limited to, a membrane such as glass or Mylar.

The light shielding structure 4 is located above the light-emitting top surface 200 or below the contact sheet 3. The light shielding structure 4 has an opening 40, the opening 40 corresponds to the microstructure 206. Therefore, the opto-electronic module may display the predetermined pattern through the opening 40, and avoid light leakage by using the light shielding structure 4. In some embodiments, the light shielding structure 4 may be an opaque light-shielding sheet, and the ray of light L is only allowed to pass through the light-shielding sheet from the opening 40. In other embodiments, the light shielding structure may be a light-shielding film, which is formed on the lower surface of the contact sheet 3 through a printing/coating process, which saves the overall lamination space.

The outer block 5 is located at an outer periphery of the light guide plate 20, and is located between the contact sheet 3 and the circuit board 1. For example, the outer block 5 is a ring structure and surrounds the light guide plate 20. Accordingly, the outer block 5 can prevent the ray of light L emitted by the light-emitting element set 22 from leaking out, thereby avoiding light leakage. In some embodiments, a material of the outer block 5 may be opaque or light-absorbing plastic, for example, but not limited to, Polycarbonate (PC). To this end, the groove 100 located between the surface 10 and the outer block 5 serves as an air escape structure for the gap S to be in communication with the ambient atmosphere, effectively preventing being hermetic inside and facilitating improvement of reliability.

According to the foregoing structure, the opto-electronic module has an air escape structure with two ends respectively in communication with internal and external ambient air. The air escape structure makes the internal air pressure and the external air pressure of the opto-electronic module to achieve balance, to prevent the opto-electronic module from being hermetic inside and having air pressure different from the external air pressure. If the internal and external air pressures are different, an internal component of the opto-electronic module may be damaged and fail due to air expansion. The product reliability of the opto-electronic module can be improved through the air escape structure. In addition, if the opto-electronic module performs touch sensing under a balanced or similar atmospheric pressure, a more accurate sensing result can be obtained, so that the accuracy and sensitivity of the opto-electronic module can be improved.

Figure 2:
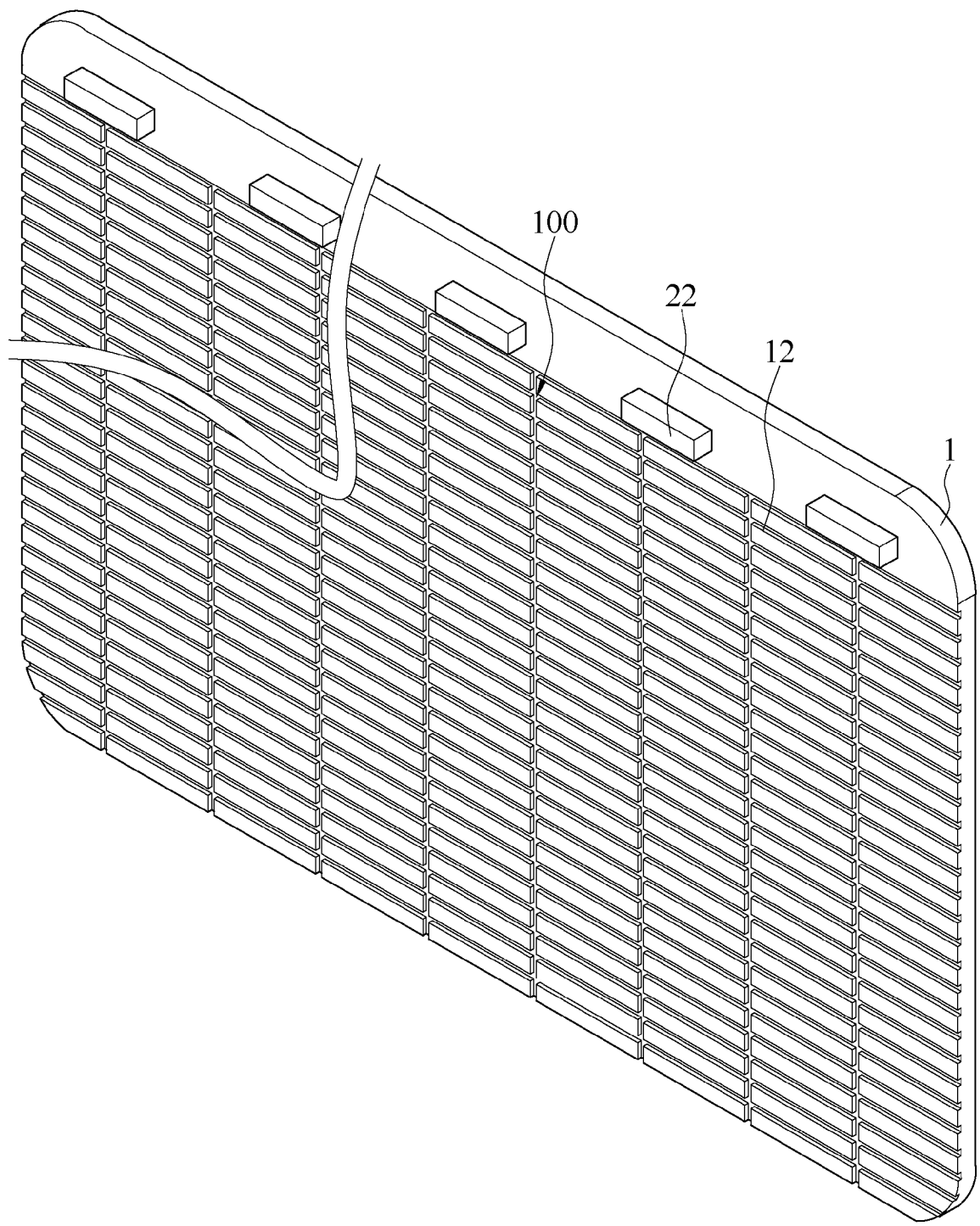
FIG. 2 is a three-dimensional schematic view of a circuit board according to the embodiment shown in FIG. 1.

Referring to FIG. 1 and FIG. 2 together, in some embodiments, the surface 10 of the circuit board 1 further includes a circuit layer 12, the circuit layer 12 having a concave-convex wiring structure, so that the circuit layer 12 forms at least one concave-convex groove 100.

In some embodiments, the air escape structure of the opto-electronic module is located in a body of the outer block 5. Specifically, the outer block 5 may allow air to be exhausted through a perforation and/or slit.

Figure 4:
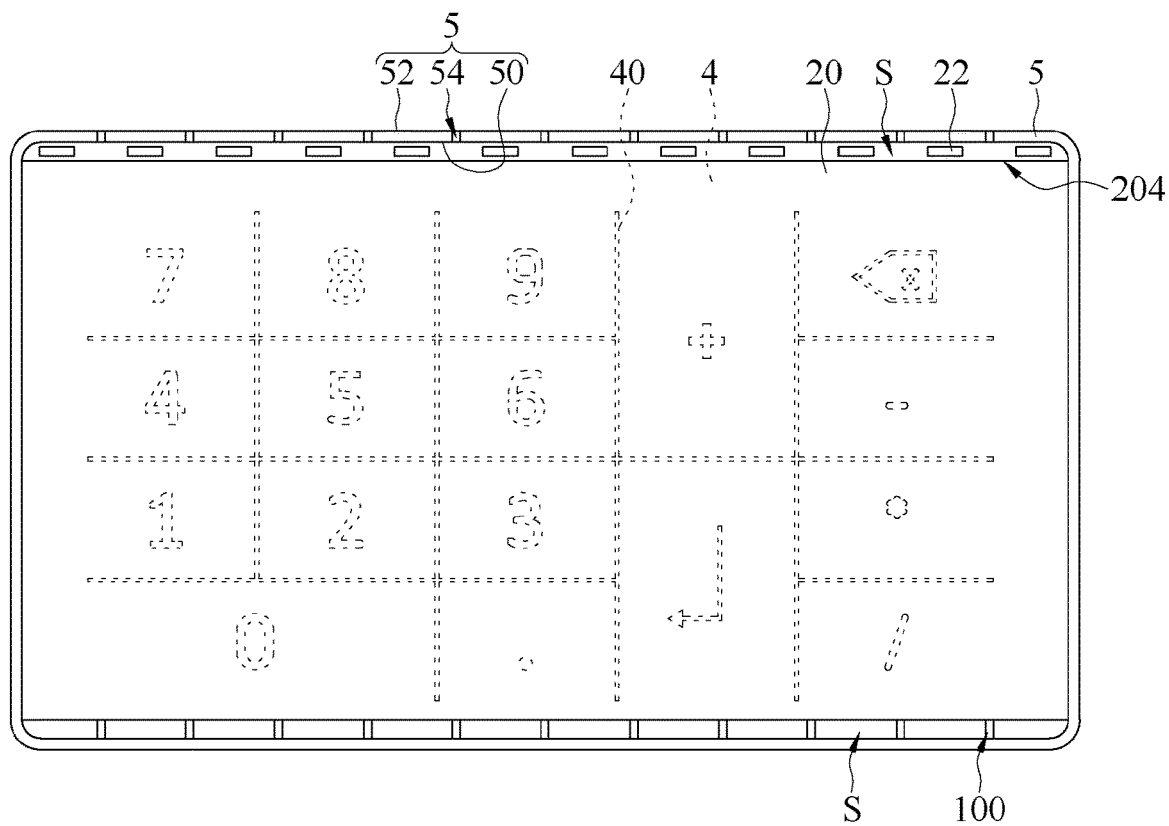
FIG. 4 is a schematic perspective top view of a light guide plate according to the embodiment shown in FIG. 1.

Referring to FIG. 1 and FIG. 4 together, an opto-electronic module in another embodiment of the present invention includes a circuit board 1, a light-emitting assembly 2, a contact sheet 3, a light shielding structure 4, and an outer block 5. The outer block 5 has an inner side surface 50, an outer side surface 52, and a channel 54. The inner side surface 50 faces the light guide plate 20, the outer side surface 52 is disposed opposite to the inner side surface 50, and the channel 54 is in communication with the inner side surface 50 and the outer side surface 52. The light-emitting element set 22 is located in the gap S between the outer block 5 and the light guide plate 20, and the channel 54 of the outer block 5 is in communication with the gap S. To this end, one end of the channel 54 is in communication with the gap S and the other end of the channel 54 is exposed to outside of the outer block 5. The channel 54 serves as an air escape structure for the gap S to be in communication with the ambient atmosphere, effectively preventing being hermetic inside and facilitating improvement of reliability. In other embodiments, the surface 10 of the circuit board 1 is a flat surface, and the opto-electronic module can still effectively prevent, by using the channel 54 of the outer block 5 as an air escape structure, being hermetic inside, so that internal air can be exhausted.

In some embodiments, the channel 54 is located on a back side of the light-emitting element set 22 opposite to the light incident side surface 204, so that the air escape structure of the outer block 5 is disposed at a position where light leakage is unlikely to occur in the overall module. For example, the outer block 5 has a plurality of channels 54 located directly behind the light-emitting surface of each light-emitting diode element, as shown in FIG. 4. Alternatively, the channels 54 are located between two adjacent light-emitting diode elements, as shown in FIG. 5, but are not limited to the foregoing implementation.

Figure 5:
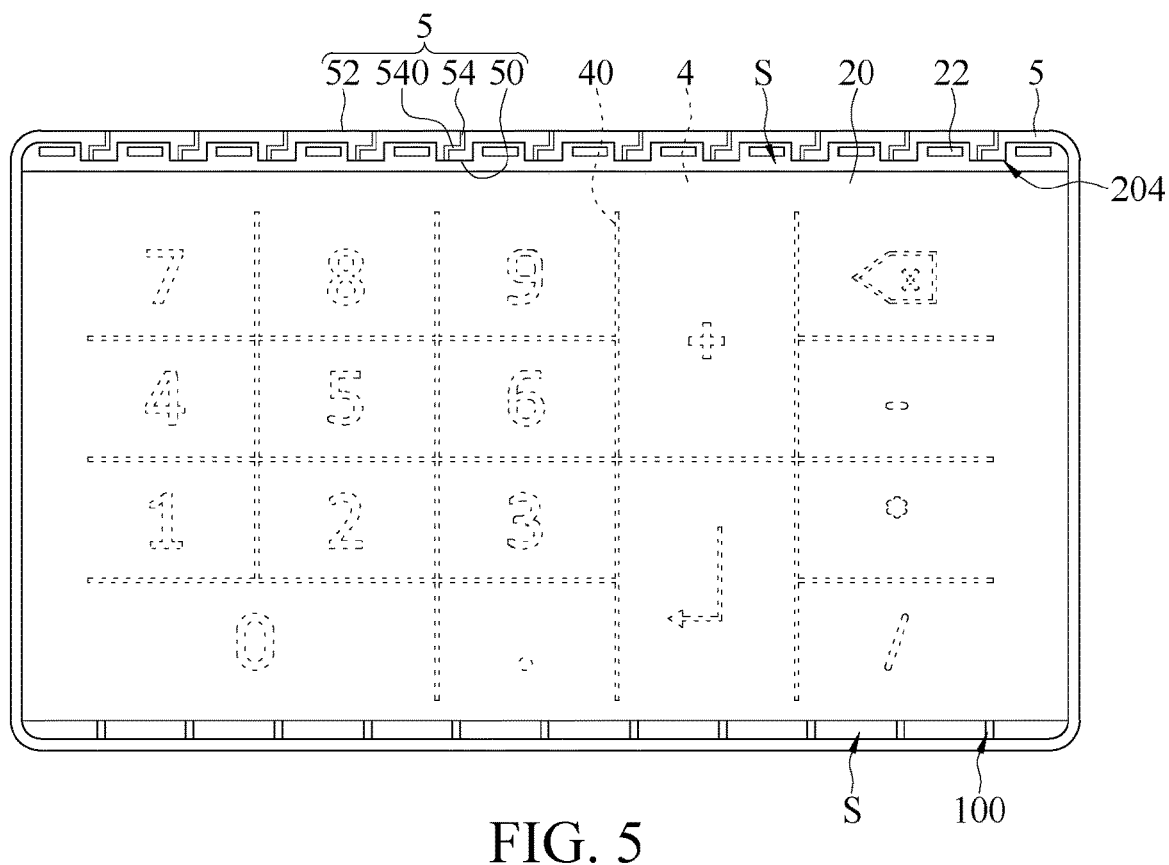
FIG. 5 is a schematic top view of an outer block according to some embodiments of the present invention.

Still referring to FIG. 5, a schematic top view of the outer block 5 is shown in some embodiments. In this embodiment, each channel 54 of the outer block 5 has a turning section 540. The turning section 540 may be a non-linear geometric shape such as lightning-shaped, saw-tooth-shaped, arc-shaped, and the like. At least a part of the ray of light L in the channel 54 is shielded through the turning section 540 of the channel 54, to prevent light leakage caused by the ray of light L in the outer block 5 passing straightforward through the channel 54. In an example, two ends of each channel 54 also have a staggered design. In detail, as shown in FIG. 5, viewed from outside the outer block 5 in a vertical direction, the two ends of the channel 54 are not collinear with each other. That is, at least part of an orthographic projection of one end of the channel 54 on the outer block 5 and part of an orthographic projection of the other end of the channel 54 on the outer block 5 do not overlap each other, thereby preventing the ray of light L from passing straightforward through the channel 54.

Figure 6A:
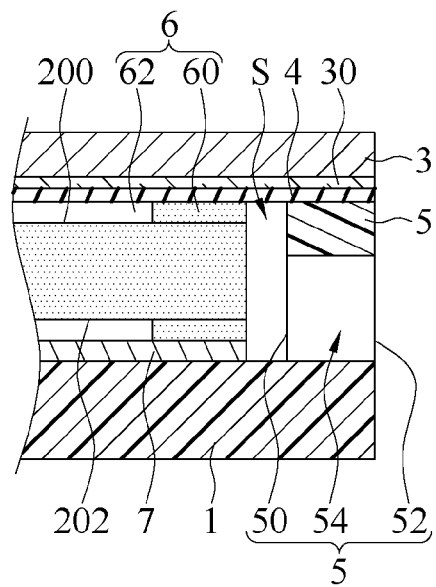
FIG. 6A is a schematic partial side view of an opto-electronic module according to some embodiments of the present invention.
Figure 6B:
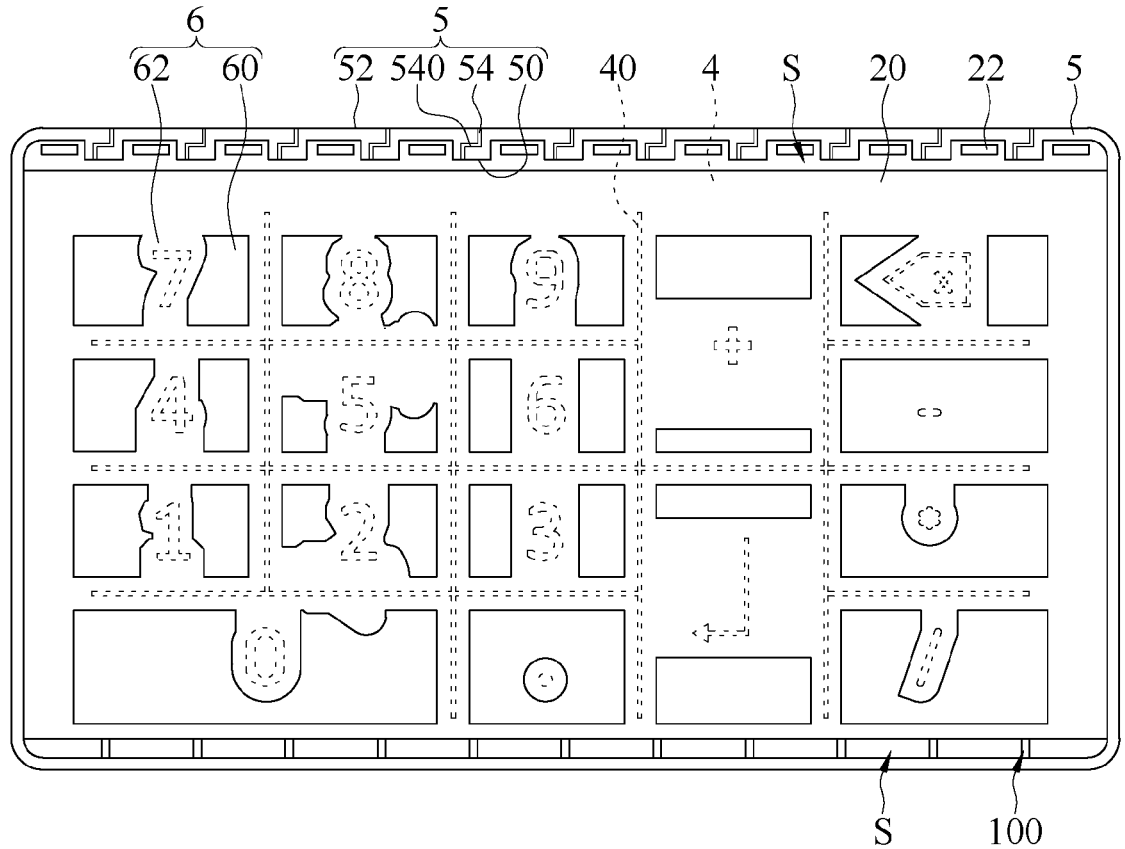
FIG. 6B is a schematic perspective top view of an adhesive layer according to the embodiment shown in FIG. 6A.
Figure 7:
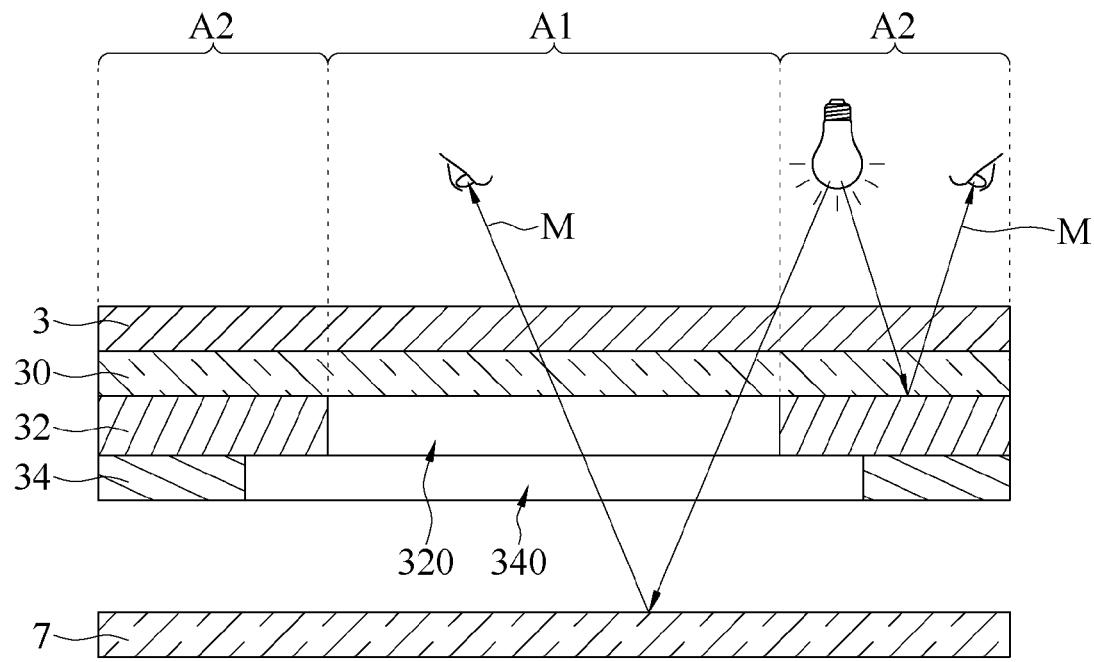
FIG. 7 is a schematic partial side view of a contact sheet according to some embodiments of the present invention.

FIG. 6A is a schematic partial side view of an opto-electronic module according to some embodiments of the present invention. FIG. 6B is a schematic perspective top view of an adhesive layer according to the embodiment shown in FIG. 6A. FIG. 7 is a schematic partial side view of a contact sheet according to some embodiments of the present invention.

Referring to FIG. 6A, FIG. 6B, and FIG. 7 together, in at least one embodiment, the opto-electronic module further includes an adhesive layer 6. The adhesive layer 6 may be located on the light-emitting top surface 200, the light guide bottom surface 202 of the light guide plate 20, and the combination thereof, to closely attached to the light shielding structure 4 or/and the circuit board 1.

In some embodiments, the adhesive layer 6 includes an adhesive region 60 and a give-way region 62 that are adjacent to each other, and the give-way region 62 is in communication with the gap S. As a result, bubbles/air contained in the adhesive layer 6 may pass through the gap S and the foregoing exhaust structures such as the groove 100 and the channel 54 to achieve a pressure balance, which have many advantages and effects as described above.

In some embodiments, the adhesive layer 6 may be, but is not limited to, a water glue layer with opaque material or light-absorbing material. Since the ray of light L penetrates the adhesive layer 6, an optical phenomenon similar to frosted glass is generated, causing a bad visual effect. Therefore, for the layout design of the adhesive layer 6, distribution positions of a light-emitting region A1 and a non-light-emitting region A2 need to be considered. In an example, the adhesive region 60 corresponds to the non-light-emitting region A2, while the give-way region 62 corresponds to the light-emitting region A1. Accordingly, an orthographic projection of the adhesive region 60 with respect to the light guide plate 20 does not overlap the microstructure 206.

Referring to FIG. 7, in some embodiments, the contact sheet 3 has a semi-transparent film 30 and a first opaque film 32, to form a multilayer film structure.

The semi-transparent film 30 is located on the lower surface of the contact sheet 3 and faces the light-emitting top surface 200. Furthermore, the contact sheet 3 has a light-emitting region A1 and a non-light-emitting region A2. The light-emitting region A1 corresponds to the microstructure 206, that is, the orthographic projection of the light-emitting region A1 with respect to the light guide plate 20 substantially overlaps the microstructure 206, while the non-light-emitting region A2 is a region other than the light-emitting region A1. In an example, the semi-transparent film 30 may be formed by printing/coating semi-transparent ink on the bottom surface of the contact sheet 3, and the distribution region is the entire surface of the contact sheet 3. Transparency of the semi-transparent ink is about 1%-3%.

The first opaque film 32 is located between the semi-transparent film 30 and the light guide plate 20, and the first opaque film 32 has a first transparent opening 320. Furthermore, the first opaque film 32 has a first transparent opening 320 and a film body outside the first transparent opening 320, which respectively correspond to the foregoing light-emitting region A1 and the non-light-emitting region A2. The first transparent opening 320 corresponds to the microstructure 206, that is, an orthographic projection of the first transparent opening 320 with respect to the light guide plate 20 substantially overlaps the microstructure 206, and the film body of the first opaque film 32 is used to shield the ray of light L from the light guide plate 20, so that the ray of light L below the non-light-emitting region A2 hardly penetrates the contact sheet 3. In an example, the first opaque film 32 may be formed by printing/coating opaque ink on the bottom surface of the semi-transparent film 30, and the distribution region is located in the non-light-emitting region A2.

According to the foregoing multilayer film structure, viewed from above the contact sheet 3, when the light-emitting element set 22 emits light, the ray of light L is emitted from the light guide plate 20. If the ray of light travels to the first opaque film 32 corresponding to the non-light-emitting region A2, then the ray of light L will be blocked/absorbed. However, if the light travels to the semi-transparent film 30 corresponding to the light-emitting region A1, at least a part of the ray of light L can penetrate through the semi-transparent film 30 and the contact sheet 3, so that the user can observe a predetermined pattern generated by the ray of light L from above.

However, when the light-emitting element set 22 does not emit light, a color appearance effect of the light-emitting region A1 will be determined by the semi-transparent film 30, and a color appearance effect of the non-light-emitting region A2 is jointly determined by the semi-transparent film 30 and the first opaque film 32. In this case, although the color appearance effect of the opaque ink of the first opaque film 32 still exists, in fact, the effect is almost negligible. In other words, the light-emitting region A1 and the non-light-emitting region A2 have different film structures, but the influence of color difference is almost unrecognizable by naked eyes and can be ignored.

In detail, the transparency of the semi-transparent ink of the semi-transparent film 30 is about 1-3%, which means that only 1-3% of light remains when a ray of light passes through semi-transparent ink once. An ambient ray of light M passes through the contact sheet 3 downward and penetrates the semi-transparent film 30 in the non-light-emitting region A2, is reflected upward at an interface between the semi-transparent film 30 and the first opaque film 32, then enters the semi-transparent film 30 again and finally reaches human eyes. In this case, the color appearance effect of the opaque ink of the first opaque film 32 is only 0.01%-0.09% intensity, and the color difference between the light-emitting region A1 and the non-light-emitting region A2 is almost difficult to be recognized by naked eyes.

Referring to FIG. 6A and FIG. 7 together, in some embodiments, the light-emitting assembly 2 further includes a light-absorbing sheet 7. The light-absorbing sheet 7 is located between the circuit board 1 and the light guide plate 20. In an example, the light-absorbing sheet 7 may be formed through modification by printing/coating opaque ink on an upper surface of a reflective sheet, and a distribution region corresponds to the light-emitting region A1, where the opaque ink may be black opaque ink. Therefore, viewed from above the contact sheet 3, when the light-emitting element set 22 does not emit light, and the ambient ray of light M from the outside world passes downwards through the contact sheet 3 and penetrates the semi-transparent film 30 in the light-emitting region A1 and reaches the opaque ink of the light-absorbing sheet 7, only a small amount of ambient ray of light M is reflected upward, then enters the semi-transparent film 30 again, and finally reaches the human eye. In this case, the color appearance effect of the opaque ink of the light-absorbing layer in the light-emitting region A1 is only 0.01%-0.09% intensity. In addition, the color appearance effect of the opaque ink of the first opaque film 32 in the non-light-emitting region A2 is only 0.01%-0.09% intensity, as described above. Therefore, the light-emitting region A1 and the non-light-emitting region A2 generate the same color appearance effect visually, and the color difference between the light-emitting region A1 and the non-light-emitting region A2 is almost difficult to recognize with naked eyes.

In some embodiments, the contact sheet 3 further has a reflective film 34. The reflective film 34 is located between the first opaque film 32 and the light guide plate 20. The reflective film 34 has a second transparent opening 340 and a film body outside the second transparent opening 340, which respectively correspond to the foregoing light-emitting region A1 and the non-light-emitting region A2. The second transparent opening 340 corresponds to the microstructure 206. In an example, the reflective film 34 may be formed by printing/coating opaque ink on the bottom surface of the first opaque film 32, and the distribution region is located in the non-light-emitting region A2. In an example, a size of the second transparent opening 340 is enlarged outwardly by an enlargement amount compared with a size of the microstructure 206, and the enlargement amount is proportional to a predetermined value, where the predetermined value may be, but is not limited to, a manufacturing tolerance. Specifically, the predetermined value includes, but is not limited to, a displacement tolerance of ink printing, an expansion and contraction tolerance, an assembly tolerance between assemblies, and an outline cutting tolerance. Accordingly, the reflective film 34 reflects the ray of light L from the light guide plate 20 back to the light guide plate 20 for reuse, so that brightness of the light guide plate 20 is optimized, thereby effectively improving light utilization of the light guide plate 20.

Figures 8A, 8B:
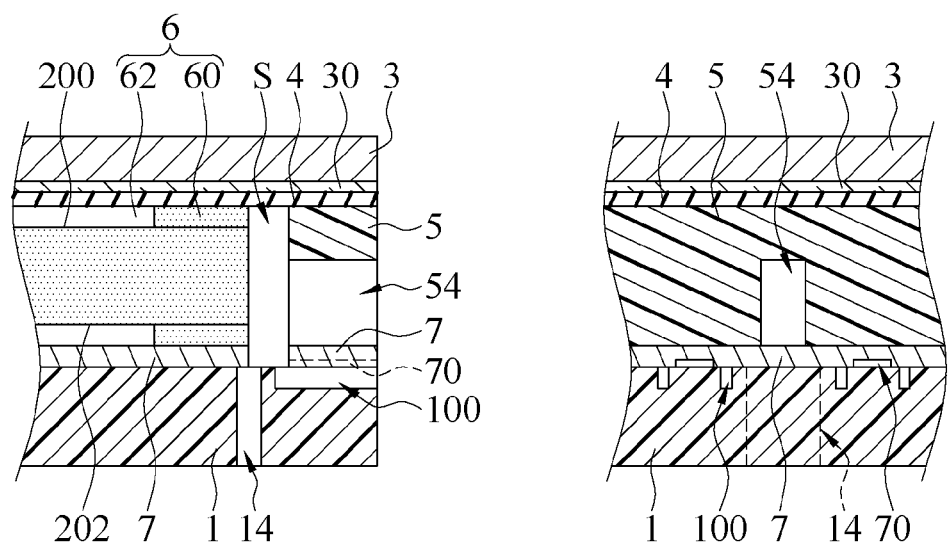
FIG. 8A is a schematic partial front view of an opto-electronic module according to some embodiments of the present invention.
FIG. 8B is a schematic right side view according to the embodiment shown in FIG. 8A.

FIG. 8A is a schematic partial front view of an opto-electronic module according to some embodiments of the present invention. FIG. 8B is a schematic right side view according to the embodiment shown in FIG. 8A.

Referring to FIG. 8A and FIG. 8B together, in some embodiments, a circuit board 1 further has at least one through hole 14. For example, the through hole 14 is located on a surface 10 of the circuit board 1 as shown in FIG. 4. One end of the through hole 14 is in communication with a gap S above the circuit board 1, and the other end of the through hole 14 is in communication with a lower surface or a side surface of the circuit board 1, to be exposed to outside of the circuit board 1. Therefore, the gap S is in communication with an external environment of the opto-electronic module through the through hole 14, that is, the through hole 14 serves as an air escape structure for the internal air pressure and the external air pressure of the opto-electronic module to achieve balance, to prevent the opto-electronic module from being hermetic inside and from having air pressure different from the external air pressure.

In some embodiments, the light-emitting assembly 2 further includes a light-absorbing sheet 7. The light-absorbing sheet 7 is located between the circuit board 1 and the light guide plate 20. The light-absorbing sheet 7 further has at least one exhaust channel 70. As shown in FIG. 8A and FIG. 8B, one end of the exhaust channel 70 is in communication with the gap S, and the other end of the exhaust channel 70 is in communication with an outer side surface of the light-absorbing sheet 7, to be exposed to outside of the light-absorbing sheet 7. Therefore, the gap S is in communication with an external environment of the opto-electronic module through the exhaust channel 70, that is, the exhaust channel 70 serves as an air escape structure for the internal air pressure and the external air pressure of the opto-electronic module to achieve balance, to prevent the opto-electronic module from being hermetic inside and from having air pressure different from the external air pressure. In at least one embodiment, the exhaust channel 70 has a light-absorbing turning section. The light-absorbing turning section may be a non-linear geometric shape such as lightning-shaped, saw-tooth-shaped, arc-shaped, and the like. At least a part of the ray of light L in the exhaust channel 70 is shielded through the light-absorbing turning section of the exhaust channel 70, to prevent light leakage caused by the ray of light L inside passing straightforward through the exhaust channel 70. In an example, two ends of each exhaust channel 70 also have a staggered design. In detail, at least part of an orthographic projection of one end of the exhaust channel 70 with respect to the light-absorbing sheet 7 and part of an orthographic projection of the other end of the exhaust channel 70 with respect to the light-absorbing sheet 7 do not overlap, which can further prevent ray of light L from passing straightforward through the exhaust channel 70.

Based on the above, according to some embodiments, the opto-electronic module has an air escape structure with two ends respectively in communication with internal and external environments. The air escape structure makes the internal air pressure and the external air pressure of the opto-electronic module to achieve balance, so as to prevent an internal component of the opto-electronic module from being damaged and failure due to air expansion, so that the product reliability of the opto-electronic module can be improved through the air escape structure. In addition, the opto-electronic module performs touch sensing under a balanced or similar atmospheric pressure, a more accurate sensing result can be obtained, which facilitates improvement of the accuracy and sensitivity of the opto-electronic module. In addition, the opto-electronic module utilizes the multilayer film structure on the lower surface of the contact sheet 3. When the light-emitting element set 22 does not emit light, the color difference between the light-emitting region A1 and the non-light-emitting region A2 is almost difficult to recognize with naked eyes. Even in some embodiments, the light-emitting region A1 and the non-light-emitting region A2 have the same color appearance effect when the light-emitting element set 22 does not emit light. Therefore, the opto-electronic module effectively avoids the problem of color difference between the light-emitting region A1 and the non-light-emitting region A2 when viewed from above, and improves the visual effect.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An opto-electronic module, comprising:
 a circuit board, having a surface and a groove on the surface;
 a light-emitting assembly, comprising:
  a light guide plate, located on the surface and having a light-emitting top surface and a light guide bottom surface opposite to the light-emitting top surface, a light incident side surface connected to the light-emitting top surface and the light guide bottom surface, and a microstructure on the light guide bottom surface; and
  a light-emitting element set, at the light incident side surface of the light guide plate and electrically connected to the circuit board, the light-emitting element set being configured to emit a ray of light toward the light guide plate when being driven;
 a contact sheet, above the light-emitting top surface and having a semi-transparent film, the semi-transparent film facing the light-emitting top surface;
 a light shielding structure, above the light-emitting top surface or below the contact sheet and having an opening, the opening corresponding to the microstructure; and
 an outer block, at an outer periphery of the light guide plate, a gap existing between the outer block and the light guide plate, and the outer block being between the contact sheet and the circuit board, wherein one end of the groove is in communication with the gap, and an other end of the groove is in communication with environment outside the opto-electronic module.

2. The opto-electronic module according to claim 1, wherein the circuit board has a circuit layer on the surface, the circuit layer forming the groove.

3. The opto-electronic module according to claim 2, wherein the outer block has an inner side surface, an outer side surface, and a channel, the inner side surface facing the light guide plate, the outer side surface being opposite to the inner side surface, and the channel being in communication with the inner side surface and the outer side surface, wherein the light-emitting element set is in the gap between the outer block and the light guide plate, and the channel is in communication with the gap.

4. The opto-electronic module according to claim 3, wherein the channel has a turning section configured to shield at least a part of the ray of light in the channel.

5. The opto-electronic module according to claim 3, wherein the channel is on a back side of the light-emitting element set opposite to the light incident side surface.

6. The opto-electronic module according to claim 1, further comprising an adhesive layer, the adhesive layer being on at least one of the light-emitting top surface and the light guide bottom surface of the light guide plate and having an adhesive region and a give-way region adjacent to the adhesive region, wherein an orthographic projection of the adhesive region with respect to the light guide plate does not overlap the microstructure, and the give-way region is in communication with the gap.

7. The opto-electronic module according to claim 1, wherein the contact sheet further has a first opaque film, the first opaque film being between the semi-transparent film and the light guide plate and having a first transparent opening, the first transparent opening corresponding to the microstructure.

8. The opto-electronic module according to claim 7, wherein the contact sheet further has a reflective film, the reflective film being located between the first opaque film and the light guide plate and having a second transparent opening, the second transparent opening corresponding to the microstructure.

9. The opto-electronic module according to claim 1, wherein the light-emitting assembly comprises a light-absorbing sheet between the circuit board and the light guide plate.

10. The opto-electronic module according to claim 9, wherein the light-absorbing sheet has at least one exhaust channel, one end of the exhaust channel being in communication with the gap, and an other end of the exhaust channel being exposed to outside of the light-absorbing sheet.

11. The opto-electronic module according to claim 10, wherein the exhaust channel has a turning section configured to shield at least a part of the light in the exhaust channel.

12. The opto-electronic module according to claim 1, wherein the surface has a through hole, one end of the through hole being in communication with the gap, and an other end of the through hole being exposed to outside of the circuit board.

13. An opto-electronic module, comprising:
a circuit board;
a light-emitting assembly, comprising:
    a light guide plate, above the circuit board and having a light-emitting top surface and a light guide bottom surface opposite to the light-emitting top surface, a light incident side surface connected to the light-emitting top surface and the light guide bottom surface, and a microstructure on the light guide bottom surface; and
    a light-emitting element set, at the light incident side surface of the light guide plate and electrically connected to the circuit board, the light-emitting element set being configured to emit a ray of light toward the light guide plate when being driven;
a contact sheet, above the light-emitting top surface and having a semi-transparent film, the semi-transparent film facing the light-emitting top surface;
a light shielding structure, above the light-emitting top surface or below the contact sheet and having an opening, the opening corresponding to the microstructure; and
an outer block, at an outer periphery of the light guide plate, a gap existing between the outer block and the light guide plate, and the outer block being between the contact sheet and the circuit board and having an inner side surface, an outer side surface, and a channel, the inner side surface facing the light guide plate, the outer side surface being opposite to the inner side surface, and the channel being in communication with the inner side surface and the outer side surface, wherein the light-emitting element set is in the gap between the outer block and the light guide plate, and the channel is in communication with the gap.

14. The opto-electronic module according to claim 13, wherein the channel has a turning section configured to shield at least a part of the ray of light in the channel.

15. The opto-electronic module according to claim 13, wherein the channel is on a back side of the light-emitting element set opposite to the light incident side surface.

16. The opto-electronic module according to claim 13, further comprising an adhesive layer, on at least one of the light-emitting top surface and the light guide bottom surface of the light guide plate and having an adhesive region and a give-way region adjacent to the adhesive region, wherein an orthographic projection of the adhesive region with respect to the light guide plate does not overlap the microstructure, and the give-way region is in communication with the gap.

\* \* \* \* \*